(12) United States Patent
Patvarczki et al.

(10) Patent No.: US 8,307,087 B1
(45) Date of Patent: Nov. 6, 2012

(54) METHOD AND SYSTEM FOR SHARING DATA STORAGE OVER A COMPUTER NETWORK

(75) Inventors: Jozsef Patvarczki, Framingham, MA (US); Endre Tamas, Worcester, MA (US); Abraao Lourenco, Malden, MA (US)

(73) Assignee: Hydrabyte, Inc., Worcester, MA (US)

( * ) Notice: Subject to any disclaimer, the term of this patent is extended or adjusted under 35 U.S.C. 154(b) by 4 days.

(21) Appl. No.: 13/165,839

(22) Filed: Jun. 22, 2011

Related U.S. Application Data (63) Continuation of application No. 12/369,114, filed on Feb. 11, 2009, now abandoned.

(51) Int. Cl.
*G06F 15/173* (2006.01)
(52) U.S. Cl. ........ 709/226; 709/218; 709/219; 709/225; 709/250; 707/827
(58) Field of Classification Search .................. None
See application file for complete search history.

(56) References Cited

U.S. PATENT DOCUMENTS

2005/0144283 A1* 6/2005 Fatula, Jr. .................. 709/226
2006/0271601 A1* 11/2006 Fatula et al. ................ 707/201
* cited by examiner

*Primary Examiner* — Thu Nguyen
*Assistant Examiner* — Nam Tran
(74) *Attorney, Agent, or Firm* — Altman & Martin; Steven K Martin (57) ABSTRACT

A system and method for the user of a computing device, a Peer, to make a portion of its local storage available to others. A Group is composed of two or more Peers with a Group Manager whose allocated storage forms a Group Bank. A Farm is composed of two or more Groups with a Farm Manager whose allocated storage forms a Farm Bank. The Grid has a Grid Manager and is the overall combination of Peers, Groups, and Farms. A file is stored by splitting it into chunks, storing each chunk on a Peer that is a member of the appropriate Bank, and forwarding the file parameters to an Information Service with a File Index. A file is retrieved by requesting the file parameters from the Information Service, retrieving the chunks from the appropriate Peers, and assembling them into a complete file.

7 Claims, 5 Drawing Sheets

METHOD AND SYSTEM FOR SHARING DATA STORAGE OVER A COMPUTER NETWORK

CROSS-REFERENCES TO RELATED APPLICATIONS

The present application is a continuation application of application Ser. No. 12/369,114, filed Feb. 11, 2009 for METHOD AND SYSTEM FOR SHARING DATA STORAGE OVER A COMPUTER NETWORK in the names of Jozsef Patvarczki, Endre Tomas, and Abraao Lourenco, herein incorporated by reference in its entirety, which claims the benefit of U.S. Provisional Patent Application No. 61/027,763, filed Feb. 11, 2008 for Method and System for Sharing Data Storage over a Global Computer Network in the names of Jozsef Patvarczki, Endre Tamas, and Abraao Lourenco.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to computer storage, more particularly, to on-line storage and sharing of data.

2. Description of the Related Art

Rapidly growing data volume and the social nature of computing are not satisfied by current closed storage solutions. With the rise of social applications, user-generated content, and faster Internet connections, users are creating and sharing more data than ever before.

Current storage solutions available to home users fall into two categories, local solutions that are not accessible globally and online solutions that do not allow a user to share data with others effectively.

Storage solutions available to high-volume users consist of large servers that use expensive high-end hardware. There are no storage solutions that can be built up from inexpensive commodity hardware available on client devices (i.e. computers, portable devices, and memory cards) by the community or enterprise that can hide the architecture differences of various platforms like MAC OS, Linux/Unix, Windows, or Symbian, and that can be used as additional storage to the existing systems (e.g. email systems).

BRIEF SUMMARY OF THE INVENTION

An object of the present invention is to provide a system and method for sharing storage capacity among computers and other personal devices.

The present invention is a system and method by which the user of a computing device with data storage can make a portion of that storage available to others over a network in a hierarchical storage bank. The lowest level of the hierarchy are the Peers, the individual computing devices. The highest level is the Grid, a combination of all of the Peers, with a Grid Manager. In between are levels comprised of various groupings of Peers, each with a manager that defines the requirements for membership in that particular level. To form the next higher level, two or more managers of the same level combine each of their groupings of Peers.

To join a Grid, a device user registers, downloads a Peer Application (PA), and initializes the device. Initialization includes the location and size of the storage to allocate to the bank and the location of the device on the network. The device becomes a Peer connected to the Grid after initialization. At this point the Peer can request that it be allowed to join a Group, the next higher level of the hierarchy.

A Group is composed of two or more Peers and the storage allocated by each Peer is combined as the Group Bank. A Group Manager sets the policies for the Group, such as the minimum amount of storage that must be allocated, which are stored by the Grid Manager.

Group Managers can join their Groups together to form the next higher level, a Farm. The Farm Bank is a combination of the Group Banks of the member Groups. A Farm Manager sets the policies for the Farm, such as the minimum amount of storage that must be available from each Group, which are stored by the Grid Manager.

The Grid is the overall combination of Peers, Groups, and Farms, and membership is available to all that meet the requirements set by the Grid Manager. All Peers are members of the Grid by virtue of registering.

A Bank can be accessed in one or more of at least two different ways, explicitly via a Bank Access Window or invisibly via a program that runs in background. The Bank Access Window displays a graphical representation of the hierarchical directory tree of the Bank and the amount of space available in the Bank. The Window also includes a number of controls for manipulating directories and files. In background mode, the Bank appears as a storage drive in the Peer's operating system and all manipulations particular to storing files to and retrieving files from the Bank are transparent to the user. Optionally, the two access methods can be combined.

When a user stores a file in a Bank, the PA splits the file into several components, called chunks and stores each chunk on a Peer that is a member of the Bank. When all the chunks are stored, the PA sends the file parameters to an Information Service run by the Grid Manager. Optionally, for better accessibility, chunks are duplicated on at least two Peers.

The algorithm used to distribute the chunks among the Peers has a "smart" mode, where the chunks are distributed based on gathered statistical information, "normal" mode, where the chunks are distributed equally among the Peers of the Bank, and "allocated" mode, where the chunks are stored in the storing Peer's allocated storage first until there is no more space and then distributed among the Peers of the Bank.

When the user wishes to retrieve a file, the PA requests the file parameters from the Information Service. Using that information, the PA then retrieves the file chunks from the appropriate Peers and assembles them into a complete file.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
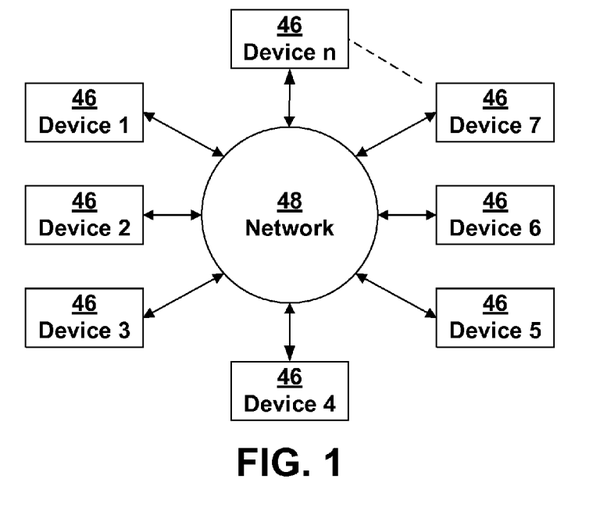
FIG. 1 is a diagram illustrating devices on a network.

The present invention is a system and method by which the user of a computer or other computing device 46 with data storage can make a portion of that storage available to others over a network 48 like that shown in FIG. 1, such as the Internet, in a storage bank. The storage bank is comprised of a hierarchical grouping of individual devices 46 that combine a portion of their local storage into a single virtual storage space. This virtual storage space has a capacity that can be as large as the sum of the local storage of each individual device 46.

Figure 2:
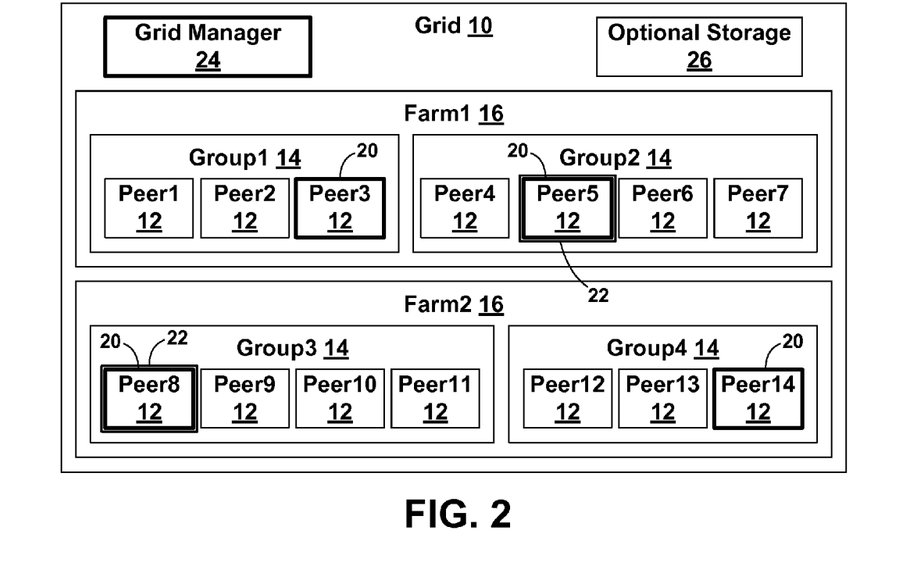
FIG. 2 is a diagram illustrating an example hierarchy of the present invention.

As can be seen in FIG. 2, at the lowest level of the hierarchy are the Peers 12, which are individual computing devices with local storage. At the highest level is the Grid 10, which is a combination of all of the Peers 12. In between are levels comprised of various groupings of Peers 12. At each of these intermediate levels, one Peer is designated as manager and defines the requirements for membership in that particular level. To form the next higher level, two or more managers of the same level combine each of their groupings of Peers 12. In the example described in the remainder of the present specification, there are four levels: Peers 12, Groups 14, Farms 16, and the Grid 10. This is but one example and the present invention contemplates any number of levels within the hierarchy.

Figure 3:
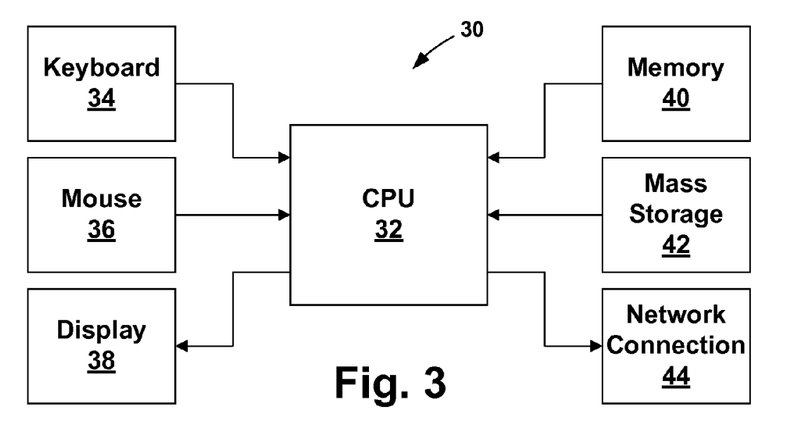
FIG. 3 is a block diagram of a typical device that can be used with the present invention.

Each Peer 12 is a computing device 46 with local storage. A Peer 12 can be, for example, a computer, a portable data assistant (PDA), or a smart phone. A block diagram of an example of such a computing device 30 is shown in FIG. 3. The device 30 has, at a minimum, a processing unit (CPU) 32, an input device such as a keyboard 34 and/or mouse 36, a display 38, temporary storage such random access memory (RAM) 40, mass storage such as a mechanical or solid-state drive 42, and a device for accessing a network 44. The Peer 12 may run one of various operating systems, such as Windows, MAC OS, LINUX/UNIX, BSD, Solaris, SymBian OS, Palm OS, Android, etc.

The user of a computing device 46 wishing to join the Grid 10 visits a network location, such as an Internet Web site, specified by the administrator of the Grid 10, the Grid Manager 24, in order to register. Registration includes, but is not limited to, providing a username, password, and e-mail address. The username and password are used to identify the user and are stored by the Grid Manager 24.

Once registered, the user downloads and installs the Peer Application (PA). Using the PA, the user initializes a number of parameters on the device 46 via a user interface window 50 such as in the example of FIG. 4. One parameter is the location on the local drive of the storage to be allocated to the storage bank, as at 52. The user can either type in the path to the location or can use the Browse button 54 to browse to and select the location. Another parameter is the amount of its local storage capacity that is allocated to the storage bank, as at 56. Typically, this value will be an integer that represents megabytes. The PA reserves the specified amount of local storage capacity so that it cannot be modified by the user or device 46. For example, entering "5000" will allocate and reserve 5 gigabytes of local storage to the storage bank. The allocated storage is available as global storage whenever the PA is active and the Peer 12 is logged in.

Figure 4:
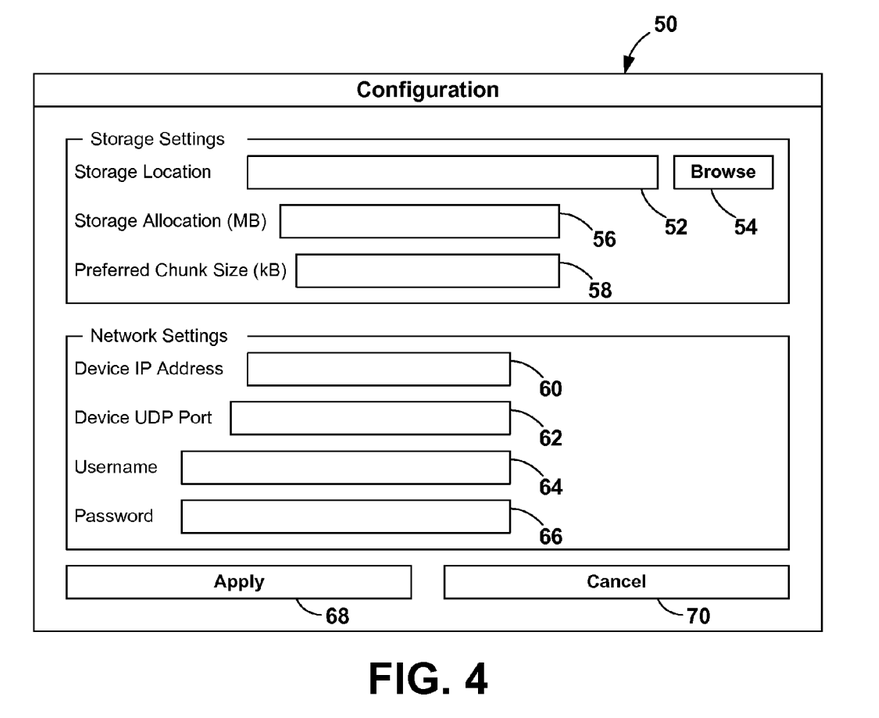
FIG. 4 is an example of a Peer Application initialization window.

Another parameter is the preferred chunk size 58, that is, the preferred size of the components a file will be broken into for storage, as described below. Typically, this value will be an integer that represents kilobytes. As described below, the values for the amount of allocated storage and chunk size may be limited by the manager of the level above the Peer 12.

The remaining parameters are the communications settings of the Peer 12. They include the Internet Protocol (IP) address 60 of the Peer 12, the port number 62 that should be used for communications with the Grid 10, the username 64, and, optionally, the password 66.

The parameters can be accepted by clicking the "Apply" button 68. Alternatively, the initialization can be cancelled with the "Cancel" button 70.

Once registered, the computing device 46 becomes a Peer 12 and operationally connected to the Grid 10. The user of the Peer 12 can view a list of Groups 14 and Farms 16 in the Grid 10, along with the storage capacity and joining requirements of each. A Group 14 is a combination of two or more Peers 12 and a Farm 16 is a combination of two or more Groups 14. The Peer 12 can request to join an existing Group 14 or, optionally, an existing Farm 16. Alternatively, a Peer 12 can create a new Group 14.

As indicated above, a Group 14 is composed of two or more Peers 12. Optionally, a Group 14 can be composed of a single Peer 12, which may be useful in certain situations, such as when a single Peer 12 wishes to join a Farm 16 without joining a Group 14. The amount of global storage available to the Peers 12 of the Group 14, the Group Bank, is equal to the sum of the storage allocated by all of the Peers 12 in the Group 14 that are currently online. Some examples of Groups include a Group composed of all of the computers in a house, or a Group composed of the computers in a department of a company. All Peers 12 in the Group 14 have access to all of the files in the Group Bank as described below.

The first Peer 12 to create and name a Group 14 is the administrator of that Group 14, the Group Manager 20. The Group Manager 20 sets the policies by which the Group 14 will operate. Such policies can include, but are not limited to, a minimum mandatory amount of storage capacity per Peer, a limited range of chunk sizes, a maximum number of Peers, a minimum Peer bandwidth capacity, and/or a minimum availability schedule that every Peer in the Group must meet. The Group Manager 20 has the sole right to edit the membership list for the Group, and set read/write privileges and upload/download limits for each Peer in the Group. The Group Manager 20 can limit the types of files that can be stored in the Group Bank.

The Group policies are stored in a central location run by the Grid Manager 24 via Information Services, described below. Peers 12 within a Group 14 communicate with each other for file access purposes through the Information Services and the Group Manager 20 is able to enforce the policies and use filters via the Information Services.

The Group Manager 20 can transfer the Group Manager role to any Peer 12 in the Group 14.

Group Managers 20 can choose to join their Groups 14 together to form the next higher level, a Farm 16. Groups 14 that are part of a Farm 16 benefit from an increased storage capacity, the Farm Bank, as well as having access to all or, optionally, a specified subset of the files available to each member Group 14. Access to the Farm Bank is the same as the Group Bank.

The Farm 16 can be managed jointly by the member Group Managers 20, or the member Group Managers can choose a single Farm Manager 22. Similarly to that of a Group Manager 20, the Farm Manager 22 sets the policies by which the Farm 16 operates. Such policies can include, but are not limited to, a minimum mandatory amount of storage capacity per Peer and/or per Group, a limited range of chunk sizes, maximum numbers of Peers and Groups, a minimum Peer bandwidth capacity, and/or a minimum availability schedule that every Peer in the Farm must meet. The Farm Manager 22 has the right to edit the Group membership list for the Farm 16 (but not the Peer members of the Groups 14), and set read/write privileges and upload/download limits for each Group in the Farm. The Farm Manager 22 can limit the types of files that can be stored in the Farm Bank.

The Farm policies are stored in a central location run by the Grid Manager 24 via Information Services, described below. Peers 12 within a Farm 16 communicate with each other for file access purposes through the Information Services and the Farm Manager 22 is able to enforce the policies and use filters via the Information Services.

When a Group 14 joins a Farm 16, it increases the Farm Bank by the size of the new Group Bank. However, a Peer member of the new Group 14 will not have access to the Farm Bank until that Peer 12 explicitly joins the Farm 16. That Peer 12 must meet the requirements set by the Farm Manager 22 to join the Farm 16. For example, if the minimum storage allocation for the Group 14 is 250 MB and the Peer has allocated 250 MB to join the Group 14, the Peer 12 will not be permitted to join a Farm 16 that has a minimum storage allocation of 500 MB until the Peer 12 increases its storage allocation to 500 MB.

The Farm Manager 22 can transfer the Farm Manager role to any Group Manager 20 or, optionally, any Peer 12 in the Farm 16.

The Grid 10 is the overall combination of Peers 12, Groups 14, and Farms 16, and is managed by the Grid Manager 24. Grid membership is available to all Peers 12, Groups 14, and Farms 16 that meet the requirements set by the Grid Manager 24. All Peers 12 are members of the Grid 10 by virtue of registering and downloading the PA.

Optionally, the Grid Manager provides data storage 26 that is independent of any Peer 12.

Figure 5:
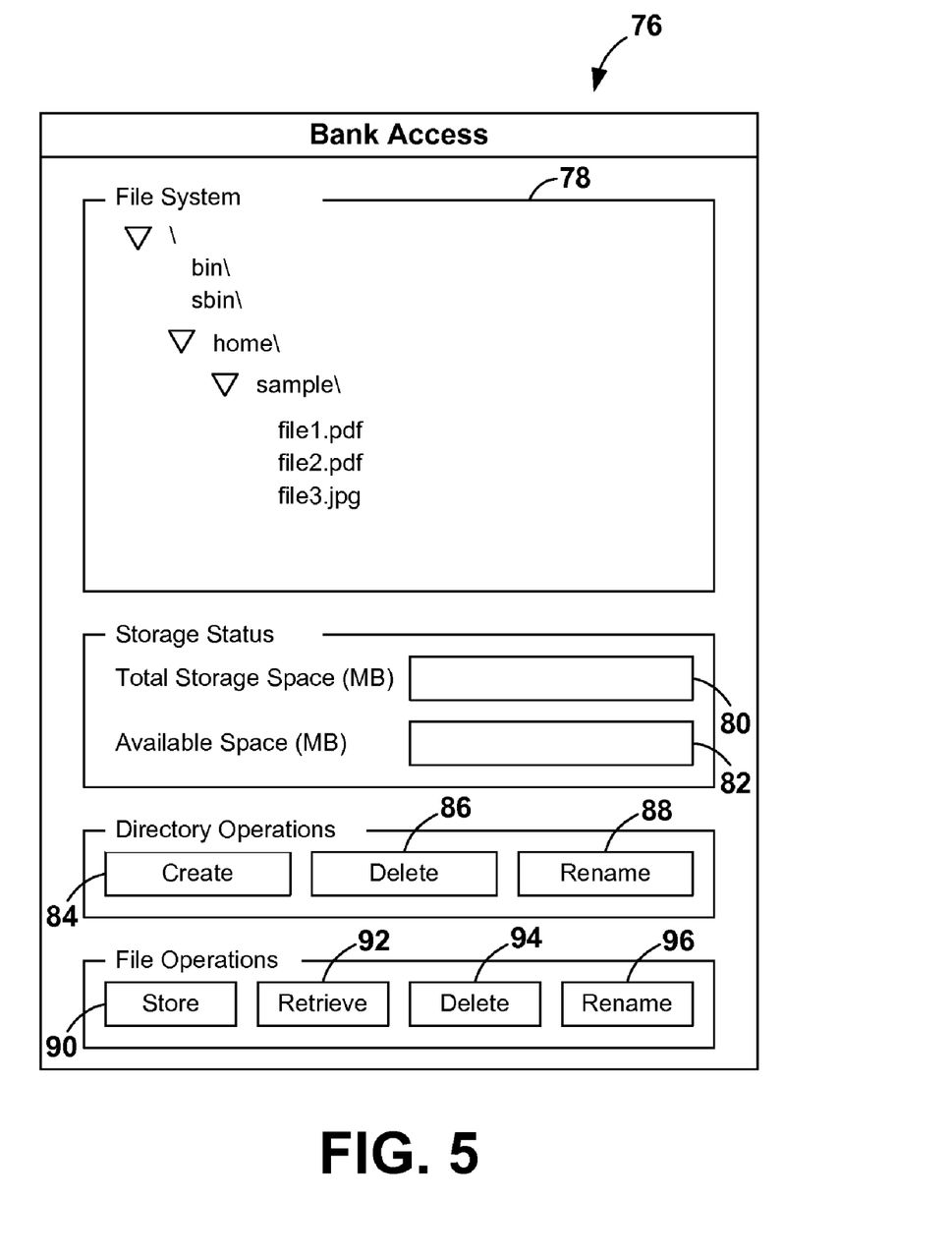
FIG. 5 is an example of a Peer Application file manipulation window.

The present invention contemplates that a Bank (Group, Farm, and/or Grid) can be accessed in at least two different ways. In the first, when the user wishes to access a Bank, the user invokes the Bank Access Window 76, an example of which is shown in FIG. 5. The Bank Access Window 76 has a number of controls. The first is the graphical representation of the hierarchical directory (folder) tree 78 of the Bank. The user can browse by selecting the desired directories to list the files and directories within.

Optionally, if a Peer 12 is a member of a Group and/or a Farm, the Bank Access Window 76 differentiates the files from each Bank. One way to differentiate files is by color. For example, names of directories and files in the Group Bank are green, names of directories and files in the Farm Bank that are not in the Group Bank are blue, and names of directories and files in the Grid Bank that are not in the Group and Farm Banks are black. Another way to differentiate is to provide a selection in the Bank Access Window 76 to show only directories and files from one Bank. The present invention contemplates that any method of differentiating files of the various Banks can be used.

The next two controls of Bank Access Window 76 display the total storage space 80 in the Bank available to the user and the amount currently in use 82. Optionally, if the amount currently in use exceeds the available space, the control is displayed in red. Optionally, there may be more than one set of these controls if directories and files from more than one Bank are shown.

The next group of controls performs operations on the directory tree 78. The selected operation is performed on the item currently selected in the directory tree. The "Create" control 84 creates a new directory of a desired name within the selected item and expands the selected item after the operation has been successfully performed. The operation checks if the desired name already exists and notifies the user if it does. The "Delete" control 86 removes a directory along with its contents. For non-empty directories, a confirmation window is presented before performing a recursive directory removal. The "Rename" control 88 renames an existing directory to a desired name. The contents of the directory are preserved. The operation checks if the desired name already exists and notifies the user if it does.

The next group of controls performs operations on files. The selected operation is performed on the item currently selected in the directory tree 78.

The "Store" button 90 uploads a file from local storage on the user's device to the selected directory. A browse window is presented for the user to select the file to store. The operation requests a name for the uploaded file and defaults to the name of the selected file. Optionally, a progress bar is presented. The store process is described below. The "Retrieve" control 92 downloads the selected file to local storage on the user's device. The operation requests a name for the retrieved file and defaults to the name of the selected file. A browse window is presented for the user to select the directory into which the selected file is to be saved. The retrieve process is described below. The "Delete" control 94 removes the selected file. A confirmation window is presented before performing the file removal. The delete process is described below. The "Rename" control 96 renames an existing file to a desired name. The contents of the file are preserved. The operation checks if the desired name already exists in the directory and notifies the user if it does.

In another method for accessing the Bank, the Bank appears as a storage drive in the Peer's operating system. There are as many drives as there are Banks. If a Peer is a member of a Group, Farm, and the Grid, there will be three drives. An application runs in background that makes access to the Bank appear to the user like access to local storage, that is, all manipulations particular to storing files to and retrieving files from the Bank are transparent to the user.

Optionally, the two access methods can be combined. For example, a Bank can appear as a storage drive to the user and operates like any other drive. However, the user has the option of opening the drive through, for example, a context menu, to reveal the Bank Access Window 76.

Figure 6:
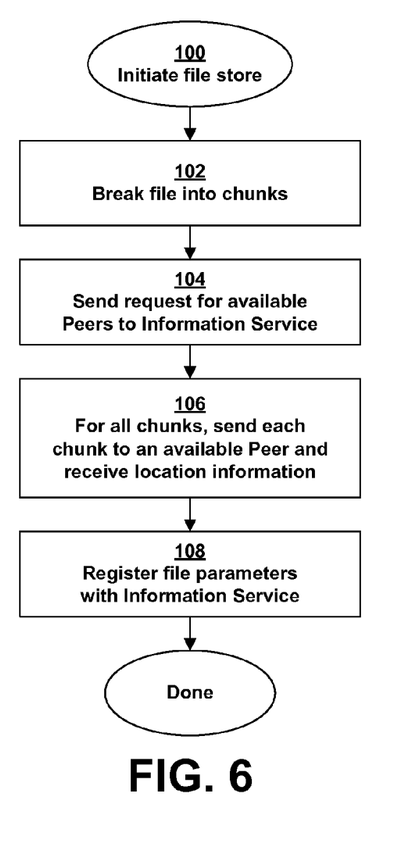
FIG. 6 is flow diagram showing how a file is stored in a Bank.

When a user stores a file in a Bank, as at 100 in FIG. 6, the PA splits the file into several components, called chunks, as at 102, and stores each chunk on a Peer that is a member of the Bank. For example, if the user wants to store a file to the Farm Bank, the chunks can be stored on any Peer of a Group that is a member of the associated Farm. The Grid Manager runs an Information Service with a File Index that keeps track of which Peers are currently available for storage. The PA queries the Information Service for a list of Peers that are available for the selected Bank, as at 104. A chunk is sent to a Peer, which notifies the PA that the chunk has been stored and where, as at 106. When all the chunks are stored, the PA sends the file parameters to the Information Service, as at 108, so that the file is accessible to all Peers with access to the Bank. The Information Service stores the file parameters in the File Index. File parameters include, for example, the number of file chunks, the location of each chunk, and how the chunks relate to each other, that is, how to put them back to together to replicate the original file. Optionally, chunks are duplicated on at least two Peers in the event a Peer is off-line when the file is needed by another.

Figure 7:
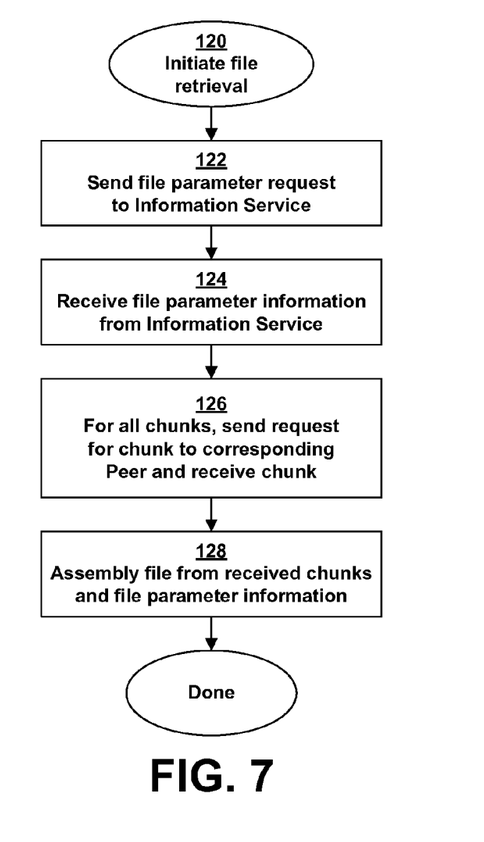
FIG. 7 is a flow diagram showing how a file is retrieved from a Bank.

When the user wishes to retrieve a file, as at 120 in FIG. 7, the PA sends a file parameter request to the Information Service, as at 122. The Information Service searches the File Index and returns the file parameters to the requesting PA, as at 124. Using that information, the PA then retrieves the file chunks from the appropriate Peers, as at 126, and assembles them into a complete file, as at 128. Optionally, the PA can send a search request to the Information Service, which searches the File Index and returns the files that meet the search parameters.

Figure 8:
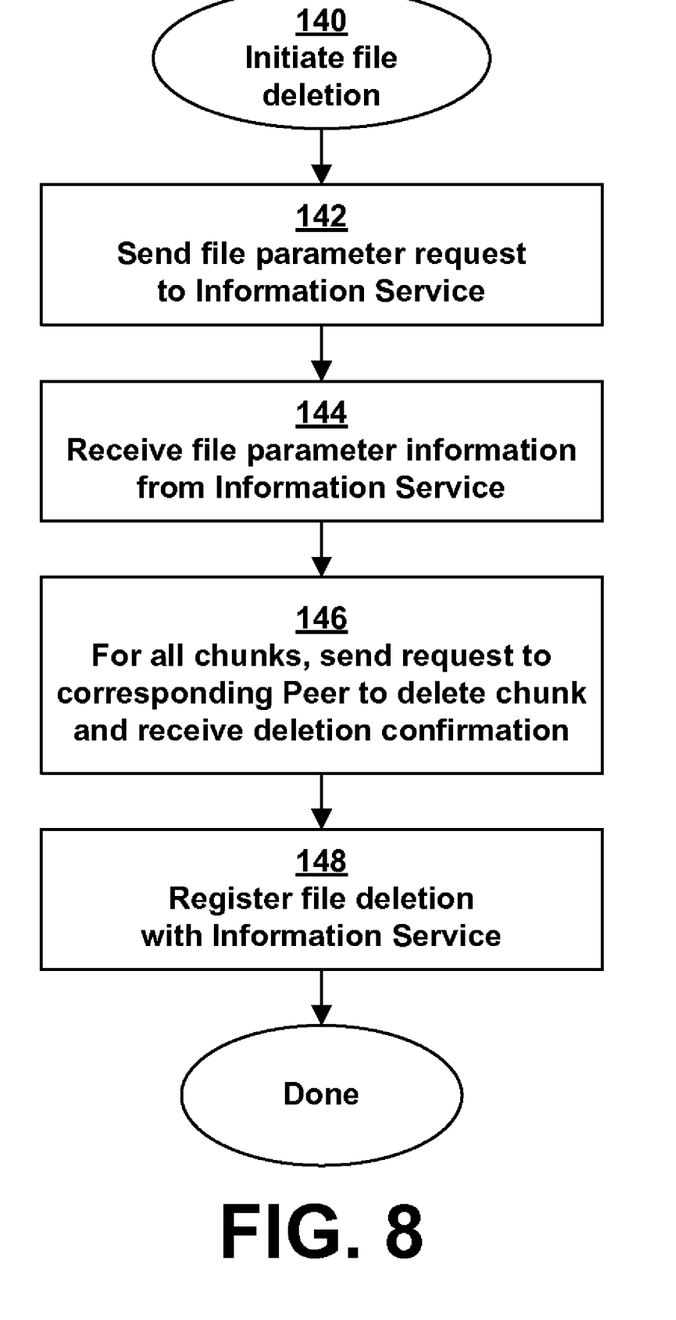
FIG. 8 is flow diagram showing how a file is deleted from a Bank.

When the user wishes to delete a file, as at 140 in FIG. 8, the PA sends a file parameter request to the Information Service, as at 142. The Information Service searches the File Index and returns the file parameters to the requesting PA, as at 144. Using that information, the PA then instructs the Peers storing each chunk to delete the chunk and receives a deletion confirmation from the Peer, as at 146. When all the chunks are deleted, the PA registers the file deletion with the Information Service, as at 148, so that the file is not longer available.

Optionally, the PA can encrypt all data transmissions. Optionally, encryption can be selectively turned on depending on whether the transmission is between Peers, within a Group, within a Farm, or within the Grid, and at the discretion of the Grid Manager.

Optionally, a portion of the local storage allocated to the Bank can be set aside as redundant storage. This redundant storage can be used to store file chunks from other Peers in order to improve the availability of files when Peers are offline.

Optionally, a Web interface operated by the Grid Manager allows a user to upload, download, modify, browse, and delete files that are normally available through the PA on the user's device.

The PA collects and forwards usage data on the Peer to a Monitoring and Analysis Service (MAS) function of the Information Service so that the Grid Manager can perform traffic analysis and monitoring. The MAS tracks the amount of incoming and outgoing data for each Peer and distributes this information within the File Index. The MAS collects network bandwidth, transferred traffic amount, and node availability statistics. Optionally, the file distribution algorithm of the PA can use this information to optimize file storage. Further, it helps manage the available and unavailable storage capacity of the Grid, checking the different bandwidths of the connections, and acting as a router to help coordinate or re-route information about the available files. Furthermore, it monitors the different activities of the Peers, files, and, upon request, generates statistical reports about them for the managers. The service is capable of tracking files and Peers, generating statistical information, and analyzing all aspects of the Grid to make it more reliable and improve performance.

The algorithm used to distribute the chunks among the Peers has three modes of operation. The first is "smart" mode, where the chunks are distributed based on gathered statistical information. The distribution of the file chunks will not be equal among the Peers of the Bank.

The second mode of operation is the "normal" mode. The chunks are distributed equally among the Peers of the Bank.

The last mode is the "allocated" mode. The chunks are stored in the storing Peer's allocated storage first. When there is no space left in the storing Peer's allocation storage, the chunks are distributed equally among the Peers of the Bank.

The Grid Manager provides Information Services at different levels of the system for collecting and handling the information about Peers, Groups, Farms, and the Grid. At the Group level is the Group Information Service (GIS). The GIS is responsible for collecting and tracking the Group's information and stores this information in a Group Information Index (GII). The GIS collects data about each Peer member of the appropriate Group such as nicknames, rights, unused/used Group Bank storage, and the total available storage of the particular Group Bank storage. The main copy of the GII is created and stored on the Group Manager's device upon creation of the Group and a duplicate is stored on a server operated by the Grid Manager. Optionally, the Group Manager can prevent the GII from being duplicated on the Grid Manager's server. Only the Group Manager can modify the contents of GII.

At the Farm level is the Farm Information Service (FIS). The FIS is responsible for collecting and tracking the Farm's information and stores this information in a Farm Information Index (FII). The FIS collects data about each member of the Farm, Group names, Peer usernames, rights, unused/used Farm Bank storage, and the total available space of the particular Farm Bank storage. The main copy of the FII is created and stored on the Farm Manager's device upon creation of the Farm and a duplicate is stored on a server operated by the Grid Manager. Optionally, the Farm Manager can prevent the FII from being duplicated on the server. Only the Farm Manager can modify the FII. The FII can be queried by component Group Managers in order to update each GII.

The Grid Information Service Index (GRIS) is operated by the Grid Manager and is responsible for collecting and tracking the Grid information. It collects data about each member Peer, Group, and Farm of the Grid, nicknames, Group names, Farm names, rights, unused/used Grid Bank storage, and total Grid Bank storage. The Grid information is stored in the Grid Information Index (GRII). GRIS can query the GIIs and FIIs to collect and update information. Duplicates of the GRII are stored on multiple servers operated by the Grid Manager for load balancing and failsafe purposes. They can communicate with each other in order to synchronize their contents. The Grid Monitoring Service can request information from the GRII.

The present invention contemplates at least one optional application, email handling support. The email application will permit very large files to be sent between Peers because the files are stored in the appropriate Bank, they do not have to be attached to the email.

Thus it has been shown and described a system for sharing data storage over a network which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A method for sharing data storage over a network, said network including a plurality of operationally-connected computing devices as peers, each of said peers having a user, processing unit, temporary storage, at least one input device, at least one output device, and local data storage, said method comprising:

(a) forming a grid from said peers, said grid having a grid manager executing an indexing service with a file index;
(b) sending a peer application for execution to each of said peers;
(c) forming a plurality of groups from subsets of said peers, each of said plurality of groups being formed by a peer as a group manager, said group manager permitting peers to join said group upon request, each peer in a group being a group member;
(d) said peer application of each group member allocating a portion of said local data storage to a group bank of its group wherein said user does not have direct access to said allocated local data storage and wherein only said group members have access to said group bank;
(e) said peer application accepting instructions from said user of a group member to store a file to said group bank, said peer application breaking said file into chunks, storing said chunks in said group bank at group bank locations, and sending parameters of said file to said indexing service for storage in said file index, said file parameters including said group bank locations and how said chunks are ordered to reassemble said file, wherein only a group member is permitted to request that a file be stored in a group bank; and
(f) said peer application accepting instructions from said user of a group member to retrieve a file from said group bank, said peer application sending a request to said indexing service for said file parameters stored in said file index, receiving said file parameters, retrieving said chunks from said group bank and reassembling said file using said file parameters, wherein only group members are permitted to request a file from a group bank.

2. The method of claim 1 further comprising duplicating said chunks and storing said duplicated chunks in different group bank locations.

3. The method of claim 1 further comprising said group manager being permitted to set group policies for joining said group, said group policies including the minimum amount of local data storage to be allocated to said group bank by each group member.

4. The method of claim 3 wherein a peer is permitted to join a group as a group member if said peer meets said group policies.

5. The method of claim 1 further comprising:

(a) permitting a plurality of group managers to form a farm, each group of said farm being a farm group, at least one of said group managers being a farm manager, said farm manager permitting farm group members to join said group upon request as farm members;
(b) said peer application forming a farm bank from said allocated local data storage of said group members of said farm groups wherein only said farm members have access to said farm bank;
(c) said peer application accepting instructions from said user of a farm member to store a file to said farm bank, said peer application breaking said file into chunks, storing said chunks in said farm bank at farm bank locations, and sending parameters of said file to said indexing service for storage in said file index, said file parameters including said farm bank locations and how said chunks are ordered to reassemble said file, wherein only a farm member can request that a file be stored in a farm bank; and
(d) said peer application accepting instructions from said user of a farm member to retrieve a file from said farm bank, said peer application sending a request to said indexing service for said file parameters stored in said file index, receiving said file parameters, retrieving said chunks from said farm bank and reassembling said file using said file parameters, wherein only farm members can request a file from a farm bank.

6. The method of claim 5 further comprising duplicating said chunks and storing said duplicated chunks in different farm bank locations.

7. The method of claim 5 further comprising said farm manager being permitted to set farm policies for joining said farm, said farm policies including the minimum amount of storage to be allocated to said farm bank by each farm group or farm member.

* * * * *